(12) United States Patent
Golbourn et al.

(10) Patent No.: US 9,680,937 B2
(45) Date of Patent: *Jun. 13, 2017

(54) COMMUNICATION METHOD AND APPARATUS

(71) Applicant: Seagate Technology LLC, Cupertino, CA (US)

(72) Inventors: Darren Golbourn, Southampton (GB); Tim Courtney, Coleraine (IE)

(73) Assignee: XYRATEX TECHNOLOGY LIMITED—A SEAGATE COMPANY, Havant (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,839

(22) Filed: May 11, 2015

(65) Prior Publication Data

US 2015/0244815 A1 Aug. 27, 2015

Related U.S. Application Data

(63) Continuation of application No. 12/829,287, filed on Jul. 1, 2010, now Pat. No. 9,032,016.

(Continued)

(51) Int. Cl.
  *G06F 15/16* (2006.01)
  *H04L 29/08* (2006.01)
  (Continued)

(52) U.S. Cl.
  CPC .......... *H04L 67/141* (2013.01); *G06F 3/0605* (2013.01); *G06F 3/067* (2013.01);
  (Continued)

(58) Field of Classification Search
  CPC .... H04L 67/141; H04L 67/10; H04L 41/5003
  (Continued)

(56) References Cited

U.S. PATENT DOCUMENTS 5,170,394 A 12/1992 Biber et al.
6,748,433 B1 6/2004 Yaakov
(Continued)

OTHER PUBLICATIONS

File History for U.S. Appl. No. 12/829,287.

*Primary Examiner* — Minh-Chau Nguyen
(74) *Attorney, Agent, or Firm* — Hollingsworth Davis, LLC

(57) ABSTRACT

A method of, and apparatus for, network communication between a client computer initiator and a target data store. The method includes requesting, by the initiator, a data transfer session between the initiator and the target over a network. The request specifies quality of service parameters for the data transfer session. The method further includes receiving, from the target, a response accepting or denying the data transfer session based on the quality of service parameters; and establishing the data transfer session between the initiator and the target if the request is accepted. An advantage in communicating QoS requirements automatically on a per session basis between a client computer initiator and a target data storage resource is that QoS guarantees can be improved because the QoS determination can be carried out at the time the data transfer session is required. This enables the current access patterns on the storage resource to be monitored and an accurate determination regarding whether the QoS parameters of a desired data transfer session can be met.

16 Claims, 8 Drawing Sheets

Related U.S. Application Data

(60) Provisional application No. 61/296,654, filed on Jan. 20, 2010.

(51) Int. Cl.
  *G06F 3/06* (2006.01)
  *G06F 17/30* (2006.01)
  *H04L 12/24* (2006.01)

(52) U.S. Cl.
  CPC ...... *G06F 3/0659* (2013.01); *G06F 17/30091* (2013.01); *H04L 41/5003* (2013.01); *H04L 67/10* (2013.01)

(58) Field of Classification Search
  USPC .................................................. 709/227–229
  See application file for complete search history.

(56) References Cited

U.S. PATENT DOCUMENTS

| | | | |
|---|---|---|---|
| 6,847,613 | B2 | 1/2005 | Mimura et al. |
| 7,319,691 | B2 | 1/2008 | Qing et al. |
| 7,664,016 | B2 | 2/2010 | Tamura |
| 8,046,489 | B2 | 10/2011 | Blom et al. |
| 2005/0025047 | A1* | 2/2005 | Bodin ................ H04W 76/025 370/229 |
| 2006/0129703 | A1 | 6/2006 | Oshikawa et al. |
| 2007/0291695 | A1* | 12/2007 | Sammour ............ H04W 36/02 370/331 |
| 2008/0137644 | A1 | 6/2008 | Reynolds et al. |
| 2008/0168118 | A1* | 7/2008 | Hickey ................ G06F 13/385 709/201 |
| 2009/0282240 | A1* | 11/2009 | Zhou ................ H04L 67/1097 713/156 |
| 2010/0094847 | A1* | 4/2010 | Malan ................... H04L 69/18 707/705 |

* cited by examiner

COMMUNICATION METHOD AND APPARATUS

CROSS REFERENCE TO RELATED APPLICATIONS

This application is a continuation of U.S. application Ser. No. 12/829,287, filed Jul. 1, 2010, now U.S. Pat. No. 9,032,016, which claims priority and benefit under 35 U.S.C. §119(e) to U.S. Provisional Patent Application No. 61/296,654; entitled "Communication Method and Apparatus", filed on Jan. 20, 2010. The content of which are incorporated herein in their entireties by reference.

The present invention relates to a method of, and apparatus for, network communication between a client computer initiator and a target data store.

Traditionally, electronic data is stored locally on a user's computer system by means of a data storage resource such as a hard disk drive (HDD) or other storage media. However, the increasing prevalence of data-heavy resources (for example, real-time high definition video) has led to an increased demand for storage capacity.

An increasingly popular area is what is known as "cloud computing". Cloud computing provides a set of scalable and often virtual resources over a network such as pan Ethernet or the Internet. A "cloud" comprises a consolidated storage system having large storage capacity (typically at the multi-petabyte level) which may serve independent customers (e.g. the cloud acts a storage service provider) or business units within an organisation (e.g. the cloud acts as a common corporate data store). In essence, cloud architecture means that the users generally do not own the physical computing resources they use and, instead, purchase usage from a third-party provider in a service-orientated architecture, or access a common corporate data store.

"Cloud"-type storage service providers are attractive to small to medium sized enterprises which do not typically have the resources to invest in over-provisioned storage infrastructures which will never be used efficiently. Storage service providers offer such users access to the storage services that they require without the need for capital expenditure on hardware and software solutions. In addition, the cost of hardware is becoming increasingly small in comparison to the cost of maintaining and managing a data storage resource. Therefore, this makes the "cloud" approach even more attractive to businesses. In many cases, service providers provide services in the manner of a utility service and billed, for example, on the basis of the resources consumed by the user or on a periodical billing basis.

It is known for the provision of services by a service provider to be covered by service level agreements (SLAs). An SLA is a negotiated agreement between a service provider (or target) offering a service and a client (or initiator) requiring use of the service. The SLA records a common agreement regarding the quality of service (QoS) to be delivered to the client. For example, in the field of data storage provision, the QoS may relate to minimum levels of (for example) performance, reliability, storage capacity, data bandwidth or read/write latency which can be guaranteed by the service provider.

These factors form part of the QoS guaranteed to the client as part of an SLA. Therefore, when a user service provider enters into an SLA with a client, it is important that the service provider has the resources necessary to provide the specified level or type of QoS forming part of that SLA, i.e. that the service provider can meet the standards of service demanded by the client as defined in the SLA.

The performance of a given data storage resource is heavily dependent upon the demands placed upon it. For example, if a number of users are using a large proportion of bandwidth of the data storage resource (possibly in excess of that agreed for their respective SLAs), then the service provider may not be able to meet the required QoS for the new SLA. Typically, the only way to circumvent this problem is to heavily over-provision the data storage resource, i.e. to have sufficient spare capacity to ensure that the QoS standards are met.

However, this approach is wasteful of resources and uneconomical because a significant proportion of the data storage resource must be kept free for use during abnormally heavy traffic conditions, and so is rarely used. Consequently, existing service-orientated storage providers can only guard against "worst case" scenarios of abnormally heavy load.

An example of a known arrangement is provided by Pillar Data Systems. In this arrangement, a QoS level can be specified based, upon the priority of the data to be accessed. The data is positioned on a hard disk based upon the specified QoS level, with the highest priority data being located on the outer rings of the respective hard disk where access characteristics are most favourable. This arrangement utilises a MIME (Multi-purpose Internet Mail Extension) file format which is communicated out of band of normal storage commands.

Whilst this approach can improve the utilisation of hard disk space, the QoS parameters are negotiated, in dependence upon the data type. However, this approach makes no attempt to address parameters such as the potential data rate that a client computer may require. Further, given the non-deterministic nature of storage resource access, this means that there is no assurance of a given bandwidth or data volume when the data is accessed and so there is still a need to over-provision the storage resource in order to meet QoS requirements. Additionally, due to the file format used, a further communication channel is required to communicate QoS parameters, increasing the cost and complexity of the service provision.

Therefore, known storage provision arrangements suffer from a technical problem that QoS requirements cannot be efficiently and accurately guaranteed. Further, additional bandwidth or communications channels are required to negotiate QoS parameters between a service provider and a client computer. This means that real-time guarantees on storage resource access QoS cannot be made without over-provisioning of the storage resource and without provision of additional communication bandwidth.

According to a first aspect of the present invention, there is provided a method of network communication between a client computer initiator and a target data store, the method comprising: requesting, by the initiator, a data transfer session between the initiator and the target over a network, said request specifying quality of service parameters for the data transfer session; receiving, from the target, a response accepting or denying the data transfer session based on said quality of service parameters; and commencing said data transfer session between the initiator and the target if said request is accepted.

By providing such a method, QoS can be agreed between an initiator and a target automatically on a per session basis, i.e. each time the client computer wishes to access the data storage resource in order to transfer data. This enables a user to book a session of data transfer access to/from the data storage resource with guaranteed levels of QoS. A session may be considered to be, for example, a semi-permanent interactive information exchange between the initiator and target devices which is established at a certain time and stopped at a later time.

Known arrangements allocate a particular block of data to a particular portion of a storage resource based upon the importance of this data. However, this approach fails to consider the current demands being drawn on the data store. If the data store is heavily utilised at any one point then, unless the data store is heavily over-provisioned, the available capacity and bandwidth will be reduced and the QoS levels which the data store can meet will be correspondingly lower.

However, the inventors of the present application have identified an advantage in communicating QoS requirements automatically on a per session basis between a client computer initiator and a target data storage resource. This enables QoS guarantees to be improved because the QoS determination can be carried out at the time the data transfer session is required, enabling the current access patterns on the storage resource to be monitored and an accurate determination to be made regarding whether the QoS parameters of a desired data transfer session can be met.

In one example, said network communication utilises a storage protocol. A storage protocol is a common communication standard between a guest and host, a transmitter and receiver, or an initiator and a target. By communicating QoS parameters using a storage protocol, bandwidth which would otherwise be necessary for parallel communication channels can be avoided.

In a further example, the storage protocol is the SCSI protocol. SCSI protocol is widely used and is widely compatible between storage devices for data transfers. A variety of SCSI protocols may be used; for example, iSCSI for communication over a network such as the internet.

In one variation, the step of requesting comprises the communication of at least one network storage command of said protocol from the initiator to the target, the or each network storage command comprising said specified quality of service parameters.

In a further variation, the step of receiving comprises the communication of at least one network storage command of said protocol from the target to the initiator, the or each network storage command comprising said specified quality of service parameters.

The inventors have identified an advantage in enabling automatic QoS negotiation between an initiator and a target by communicating the QoS parameters within a network storage command, i.e. via in-band communication. By utilising network storage commands to transfer QoS parameters between initiators and targets, out of band communications to transmit QoS requirements are not needed. This reduces the cost and complexity of providing the apparatus, software interfaces and network bandwidth which would otherwise be required to support an additional, parallel out of band communication channel between the initiator and the target.

In one variation, the storage protocol comprises an OSD protocol and the or each network storage command is addressed to at least one object ID. The OSD protocol is a flexible and adaptable protocol for modern storage systems.

In one example, the quality of service parameters are associated with a specified object ID address. By associating the QoS parameters with a specified object ID address, a command to this particular address will allow the initiator or target to obtain the QoS parameters stored within, facilitating transmission of QoS parameters with minimal additional hardware or software.

In a further example, the quality of service parameters are specified in the metadata attributes of said network storage command associated with said specified object ID address. In a network storage command using the OSD protocol, there is data space available for metadata pages associated with an object ID address. By utilising this data space for transmission of QoS parameters, QoS parameters can be readily inserted into, and extracted from, a network storage command.

In one arrangement, the specified object ID is a non-reserved object ID. By utilising a non-reserved ID, the QoS parameters can be transmitted without affecting the normal operation of the network storage commands to, for example, access storage objects.

In one version, the quality of service parameters form part of a service level agreement. A service level agreement is a convenient way to specify the requirements of a desired connection.

In a further variation, the method further comprises, after establishing the data transfer session, commencing the data transfer session. Once the QoS parameters for the particular session are agreed, the data transfer itself can take place, for example, utilising network storage commands.

According to a second aspect of the present invention, there is provided a controller for a client computer initiator, the controller being configured for network communication with a target data store and operable to: request a data transfer session between the initiator and the target over a network, said request specifying quality of service parameters for the data transfer session; receive, from the target, a response accepting or denying the data transfer session based on said quality of service parameters; and commence said data transfer session between the initiator and the target if said request is accepted.

According to a third aspect of the present invention, there is provided a controller for a target data store, the controller being configured for network communication with a client computer initiator and operable to: receive a request for a data transfer session between the initiator and the target over a network, said request specifying quality of service parameters for the data transfer session; send a response accepting or denying the data transfer session based on said quality of service parameters; and commence said data transfer session between the initiator and the target if said request is accepted.

By providing such a method, QoS can be agreed between an initiator and a target automatically on a per session basis, i.e. each time the client computer wishes to access the data storage resource in order to transfer data. A session may be considered to be, for example, a semi-permanent interactive information exchange between the initiator and target devices which is established at a certain time and stopped at a later time.

Known arrangements allocate a particular block of data to a particular portion of a storage resource based upon the importance of this data. However, this approach fails to consider the current demands being drawn on the data store. If the data store is heavily utilised at any one point then, unless the data store is heavily over-provisioned, the available capacity and bandwidth will be reduced and the QoS levels which the data store can meet will be correspondingly lower.

However, the inventors of the present application have identified an advantage in communicating QoS requirements automatically on a per session basis between a client computer initiator and a target data storage resource. This enables QoS guarantees to be improved because the QoS determination can be carried out at the time the data transfer session is required, enabling the current access patterns on the storage resource to be monitored and an accurate determination to be made regarding whether the QoS parameters of a desired data transfer session can be met.

In one example, said network communication utilises a storage protocol. A storage protocol is a common communication standard between a guest and host, a transmitter and receiver, or an initiator and a target. By communicating QoS parameters using a storage protocol, bandwidth which would otherwise be necessary for parallel communication channels can be avoided.

In a further example, the storage protocol is the SCSI protocol. SCSI protocol is widely used and is widely. compatible between storage devices for data transfers. A variety of SCSI protocols may be used; for example, iSCSI for communication over a network such as the internet.

In one arrangement, the request for a data transfer session comprises the communication of at least one network storage command of said protocol between the initiator and the target, the or each network storage command comprising said specified quality of service parameters.

By utilising network storage commands to transfer QoS parameters between initiators and targets, out of band communications to transmit QoS requirements are not needed. This reduces the cost and complexity of providing the apparatus, software interfaces and network bandwidth which would otherwise be required to support an out of band communication channel between the initiator and the target.

In one variation, the storage protocol comprises an OSD protocol and the or each network storage command is addressed to at least one object ID. The OSD protocol is a flexible and adaptable protocol for modern storage systems.

In one example, the quality of service parameters are associated with a specified object ID address. By associating the QoS parameters with a specified object ID address, a command to this particular address will allow the initiator or target to obtain the QoS parameters stored within, facilitating transmission of QoS parameters with minimal additional hardware or software.

In a further example, the quality of service parameters are specified in the metadata attributes of said network storage command associated with said specified object ID address. In a network storage command using the OSD protocol, there is data space available for metadata pages associated with an object ID address. By utilising this data space for transmission of QoS parameters, QoS parameters can be readily inserted into, and extracted from, a network storage command.

In one arrangement, the specified object ID is a non-reserved object ID. By utilising a non-reserved ID, the QoS parameters can be transmitted without affecting the normal operation of the network storage commands to, for example, access storage objects.

In one version, the quality of service parameters form part of a service level agreement. A service level agreement is a convenient way to specify the requirements of a desired connection.

In a further variation, the controller is operable to, commence the data transfer session. Once the QoS parameters for the particular session are agreed, the data transfer itself can take place, for example, utilising network storage commands.

According to a fourth aspect of the present invention, there is provided a network storage protocol for communication of storage data between a client computer initiator and a target data store during a data transfer session, the protocol comprising at least one network storage command including data and metadata relating to data storage, wherein the network storage command further comprises quality of service parameters of the data transfer session.

In one configuration, the storage protocol comprises the SCSI protocol. The SCSI protocol is widely used and is widely compatible between storage devices for data transfers. A variety of SCSI protocols may be used; for example, iSCSI for communication over a network such as the internet.

In an alternative configuration, the storage protocol comprises an OSD protocol and the or each network storage command is addressed to at least one object ID.

In one example, the quality of service parameters are associated with a specified object ID address in the network storage command. In another example, the quality of service parameters are specified in the metadata attributes of said network storage command associated with said specified object ID address. In a further example, said specified object ID is a non-reserved object ID.

According to a fifth aspect of the present invention, there is provided a method of network communication between a client computer initiator and a target data store, the method comprising:

transmitting, between the initiator and the target, at least one network storage command comprising data and metadata relating to data storage, wherein the or each network storage command further comprises quality of service parameters of a data transfer session.

According to a sixth aspect of the present invention, there is provided a controller for a client computer initiator, the controller being configured for network communication with a target data store and operable to transmit to the target at least one network storage command comprising data and metadata relating to data storage, wherein the or each network storage command further comprises quality of service parameters of a data transfer session.

According to a seventh aspect of the present invention, there is provided a controller for a target data store, the controller being configured for network communication with a client computer initiator and operable to transmit to the initiator at least one network storage command comprising data and metadata relating to data storage, wherein the or each network storage command further comprises quality of service parameters of a data transfer session.

According to an eighth aspect of the present invention, there is provided a computer program product executable by a programmable processing apparatus, comprising one or more software portions for performing the method steps of the first aspect.

According to a ninth aspect of the present invention, there is provided a computer usable storage medium having a computer program product stored thereon.

According to a tenth aspect of the present invention, there is provided an electronic data store comprising a data storage resource and the controller of the third aspect of the invention.

Embodiments of the present invention will now be described in detail with reference to the accompanying drawings, in which.

Figure 1:
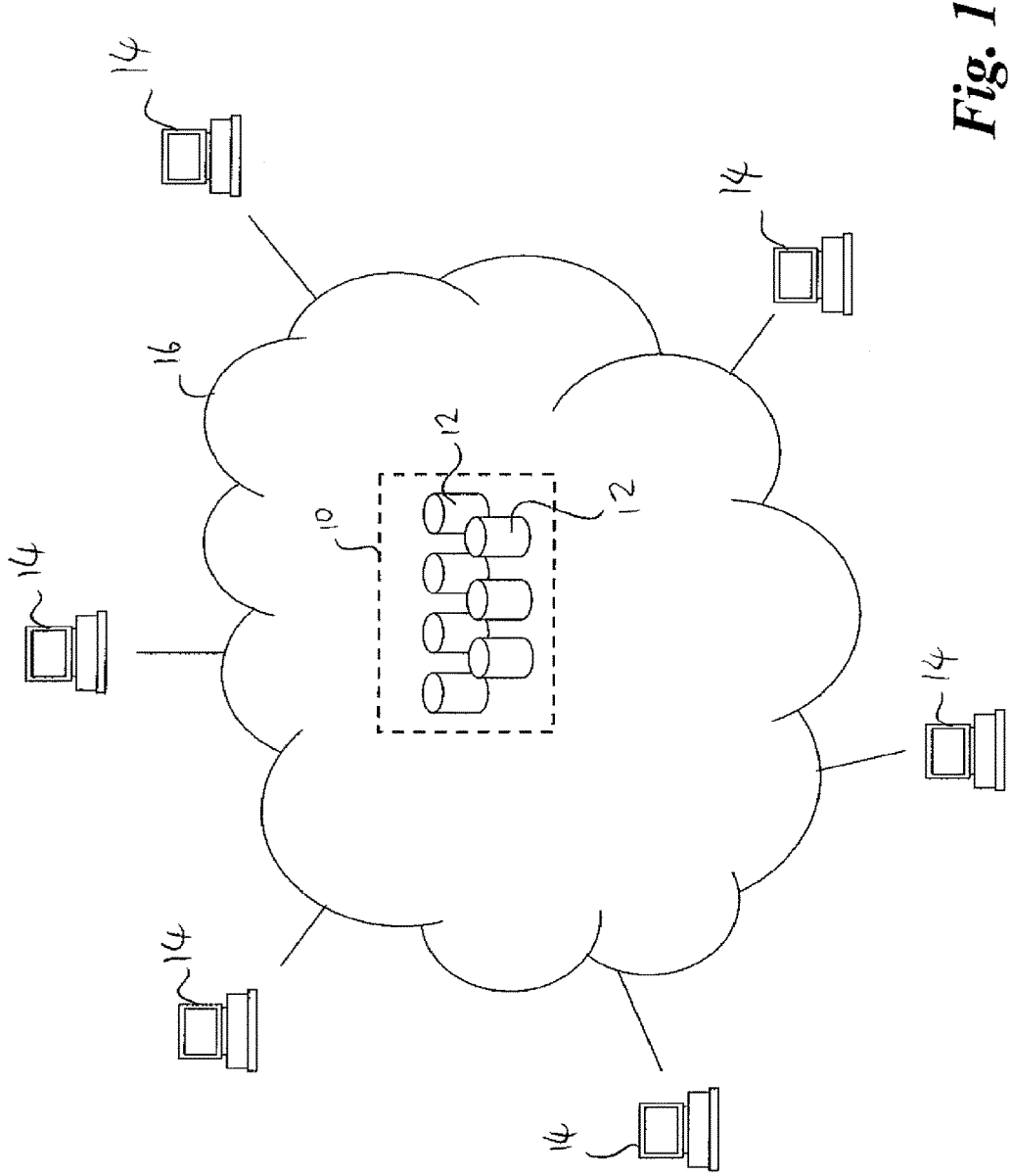
FIG. 1 is a schematic diagram of a cloud network.

FIG. 1 shows a schematic illustration of an electronic data store 10 provided by a service provider. The data store 10 comprises a plurality of storage units 12. Each storage unit 12 may take the form of, for example, an individual hard drive or a collection of hard disk drives (HDDs) linked together through a protocol such as Redundant Array of Inexpensive Disks (RAID) to form a logical unit. However, irrespective of the number or configuration of HDDs present, the data store 10 is presented to a client computer 14 as a single logical drive.

A plurality of client computers 14 connect to the data store 10 through a cloud network 16. The cloud network 16 may take a number of forms, for example, an internet network, a cable network or a mobile network. The cloud network 16 enables each user of each client computer 14 to read data from, or write data to, the data store 10 as if the data was stored locally. Each client computer 14 has an SLA with the service provider of the data store 10 which specifies the QoS required by the user of the client computer 14 whilst connected to the data store 10. For example, the SLA might specify the type of data access required (e.g. random or sequential) and/or the bandwidth/latency requirements of the access required to, or the retrieval required from, the data store 10.

Figure 2:
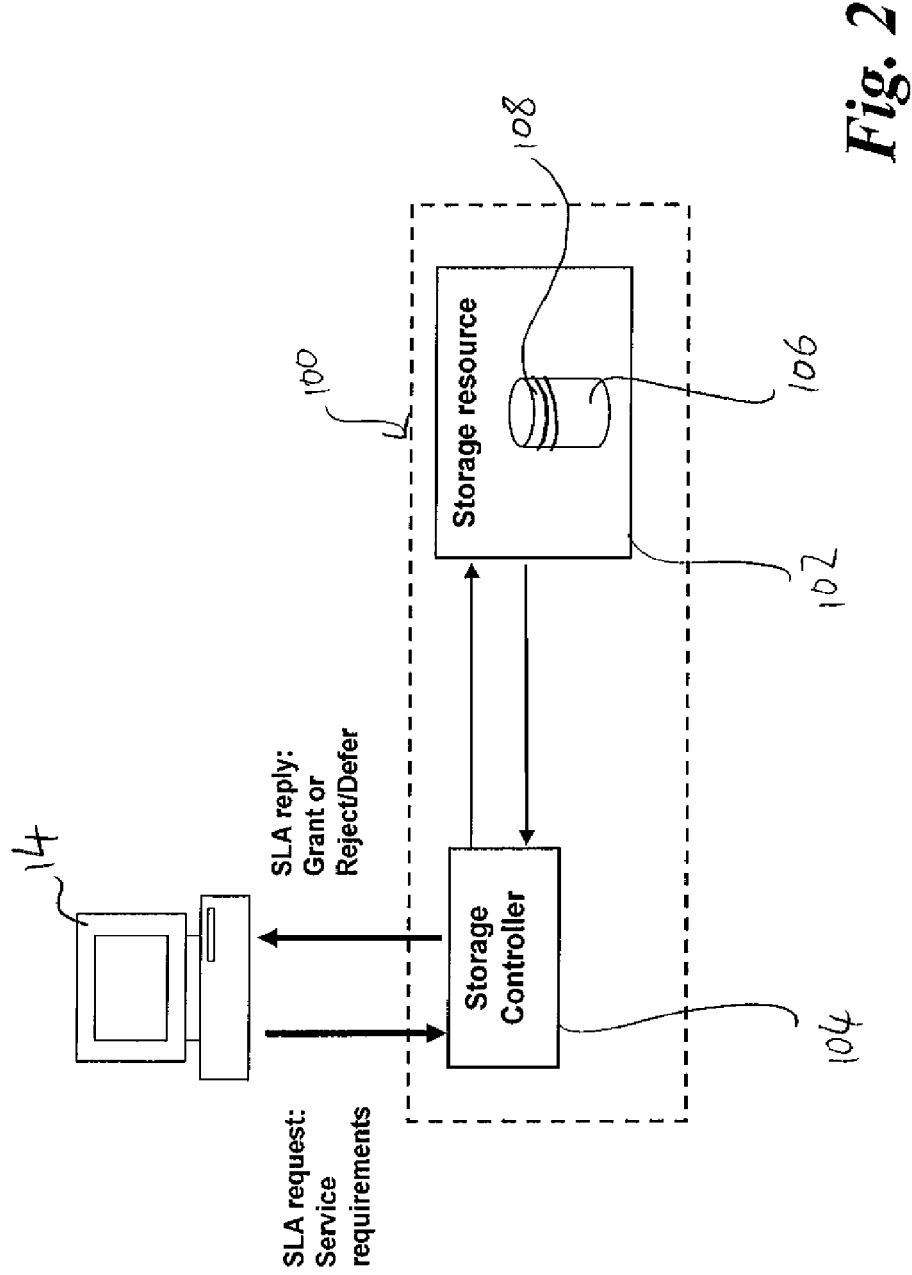
FIG. 2 is a schematic diagram of an embodiment of an electronic data store.

FIG. 2 shows an electronic data store 100. The electronic data store 100 comprises a data storage resource 102 and a storage controller 104.

The data storage resource 102 comprises at least one data storage component 106. Commonly, a plurality of data storage components 106 is provided, each data storage component 106 being connected over a storage network (not shown). In an example, the data storage component 106 comprises a group of approximately five to eight physical drives 108 linked together in a RAID arrangement.

RAID architecture combines a multiplicity of small, inexpensive disk drives into an array of disk drives that yields performance that can exceed that of a single large drive. This arrangement enables high speed access because different parts of a file can be read from different devices simultaneously, improving access speed and bandwidth.

Data interleaving in a RAID arrangement is usually in the form of data "striping" in which the data to be stored is broken down into blocks called "stripe units". The "stripe units" are then distributed across the physical drives 108. Therefore, should one of the physical drives 108 in a group forming a storage component 106 fail or become corrupted, the missing data can be recreated from the data on the other drives 108. The data may be reconstructed through the use of the redundant "stripe units" stored on the remaining physical drives 108 using known RAID techniques such as XOR.

The physical drives 108 may take any form of storage device, such as, for example, tape drives, disk drives, non-volatile memory, or solid state devices. Although most RAID architectures use hard disk drives as the main storage devices, it will be clear to the person skilled in the art that the embodiments described herein apply to any type of suitable storage device. Further, a physical drive 108 may take the form of a single partition on a hard disk drive. Therefore, a single hard disk drive may comprise a plurality of physical drives 108 in the context of the electronic data store 100.

The storage controller 104 controls the flow of data into and out of the storage resource 102, and controls access to the storage resource 102 from client computers 14. The storage controller 104 is configured to function as a portal for a client computer 14 and presents an interface for communication between a client computer 14 and the data storage resource 102. This may take the form of, for example, a webpage or a portal whereby a user can request access to the data storage resource 102.

The storage controller 104 is operable to receive SLA requests (and their respective QoS requirements) from a client computer 14. The storage controller 104 is further operable to process SLAs requests and to determine whether the SLA request should be accepted or denied. This may be based on a number of factors or considerations; for example, the current usage of the data storage resource 102. The procedure to determine whether the SLA should be requested or denied is not material to the present invention and will not be described further here.

The storage controller 104 is further operable to respond to the client computer 14 either granting or denying the client computer 14 access to the data storage resource 102. Additionally, the storage controller 104 may also be configured to defer the SLA connection; for example, by a time delay or by a negotiation process.

The storage controller 104 may take the form of, for example, one or more computer servers which may be provided separately from, or may form a part of, the storage resource 102. Alternatively, the storage controller 104 may simply form part of the data storage resource 102; for example, a control board located in a data storage "box". The operational features of the storage controller 104 the may be implemented in either a hardware or software layer. The skilled person will be readily aware that the above features of the present embodiment could be implemented in a variety of suitable configurations and arrangements within the context of the present invention.

Figure 3:
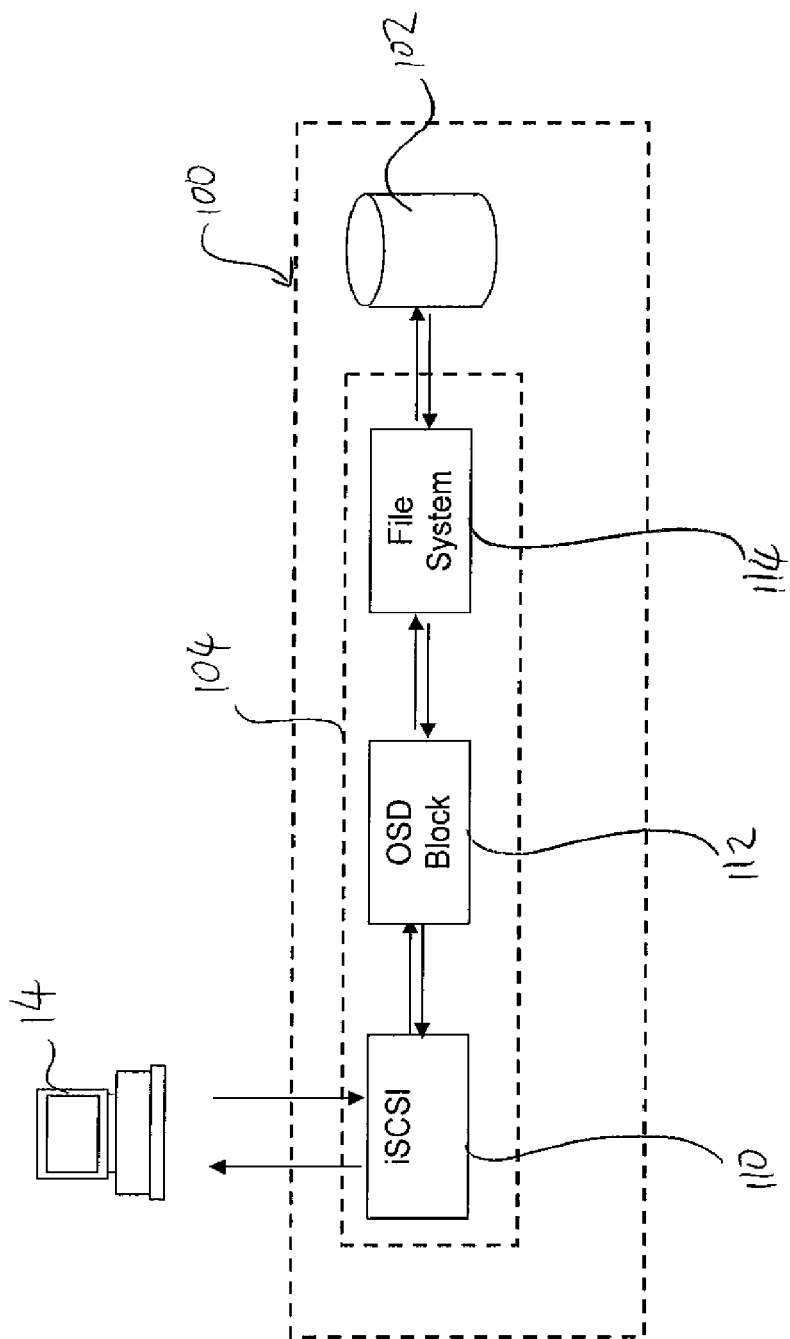
FIG. 3 is a schematic diagram showing a storage controller of the electronic data store of FIG. 2 in more detail.

FIG. 3 shows the components of the storage controller 104 in more detail. The storage controller 104 comprises an iSCSI (Internet Small Computer System Interface) controller 110, an OSD block 112 and a file system block 114.

The iSCSI controller 110 utilises the iSCSI protocol for communication with the client computer 14. The iSCSI protocol is an Internet Protocol (IP) based storage networking standard which utilises the TCP/IP protocol for connecting data storage facilities over networks such as local area networks (LANs), wide area networks (WANs), or the Internet using existing network infrastructure. The iSCSI protocol enables SCSI compliant devices to negotiate and exchange SCSI commands over a network such as the cloud network 16 shown in FIG. 1. Effectively, the iSCSI emulates a local SCSI storage bus over a network, providing an advantage that no dedicated cabling or transmission channel is required; iSCSI connections and command exchange can be run over existing switching and IP infrastructure.

In order for the client computer 14 to communicate with the electronic data store 100, the client computer 14 is configured to operate as an iSCSI client, also known as an initiator. The initiator is so called because it is the device which initiates an exchange of SCSI commands with a target, in this case the data storage resource 102, more specifically a data storage component 106.

The iSCSI client interface can be implemented in either software or hardware. Software initiators which utilise an existing network card and implement the SCSI commands in the form of a program layer are the most common mode of deploying iSCSI on typical client computers, due to reduced hardware costs and greater adaptability. It will be clear to the person skilled in the art that the embodiments described herein apply to any type of suitable interface.

The data storage resource 102 or, more specifically, a data storage component 106 forming at least a part of the data storage resource 102 comprises an individually addressable SCSI device that is part of a target SCSI device. The iSCSI commands indicate which part of the data storage resource 102 is to be accessed.

Therefore, in order to access data from, for example, a data storage component 106 forming part of the data storage network 102, the client computer initiator 14 negotiates with the target data storage resource 102 to connect to a data storage component 106. This results in an iSCSI connection corresponding to a connection to a SCSI hard disk. The client computer initiator 14 treats the allocated data storage component 106 the same way as a local hard drive.

The iSCSI controller 110 is configured to receive iSCSI commands from the client computer initiator 14 and to send commands back to the client computer initiator 14 as appropriate. When an iSCSI command is received by the iSCSI controller 110, it is passed to the OSD block 112.

The OSD block 112 uses the object-based storage standard to process Object-based Storage Devices. An Object-based Storage Device (OSD) is a computer storage device which operates at a higher level of abstraction than block-orientated interfaces. An OSD does not read and write fixed sized blocks of data as in a conventional file system structure. Instead, the OSD standard organizes data into variable-sized data packages known as objects. Each object is associated with data and metadata comprising an extensible set of attributes which describe the object. Some attributes are implemented directly by the OSD block 112; for example, the number of bytes in an object.

The OSD block 112 uses a SCSI command set developed by the T10 committee of the International Committee for Information Technology Standards. In the OSD standard, objects are specified with a 64-bit partition ID and a 64-bit object ID. The command interface comprises storage commands to create and delete objects, to write bytes and read bytes to and from individual objects, and to "set" attributes on objects, and to "get" those attributes on objects.

The OSD block 112 is responsible for managing the storage of objects and their metadata. Within the OSD block 112, partitions are created and deleted, and objects are created and deleted within partitions. The partitions and objects do not have a fixed size and they are able to increase in size subject to the capacity limitations of the data storage resource 102 or logical quota constraints on a particular partition. The OSD block 112 is also operable to process incoming iSCSI command queues, process the iSCSI commands, and then map the access/retrieval requests for storage objects to file blocks which can be passed to the file system 114.

The file system 114 is a software or hardware block controller which is operable to process requests and to manage directly the file systems for the data storage resource 102 during access by multiple client computers 14. The file system 114 is required to manage concurrent access to the same logical device in order to prevent the data on the data storage resource 102 from becoming corrupt under multiple access conditions; for example, if two devices were attempting to modify the same part of the same file system at the same time. The file system 114 implements a shared file system for concurrency control. It provides each client computer 14 accessing the data storage resource 102 with a consistent view of the file system, mitigating the risk of data corruption and loss.

Figure 4:
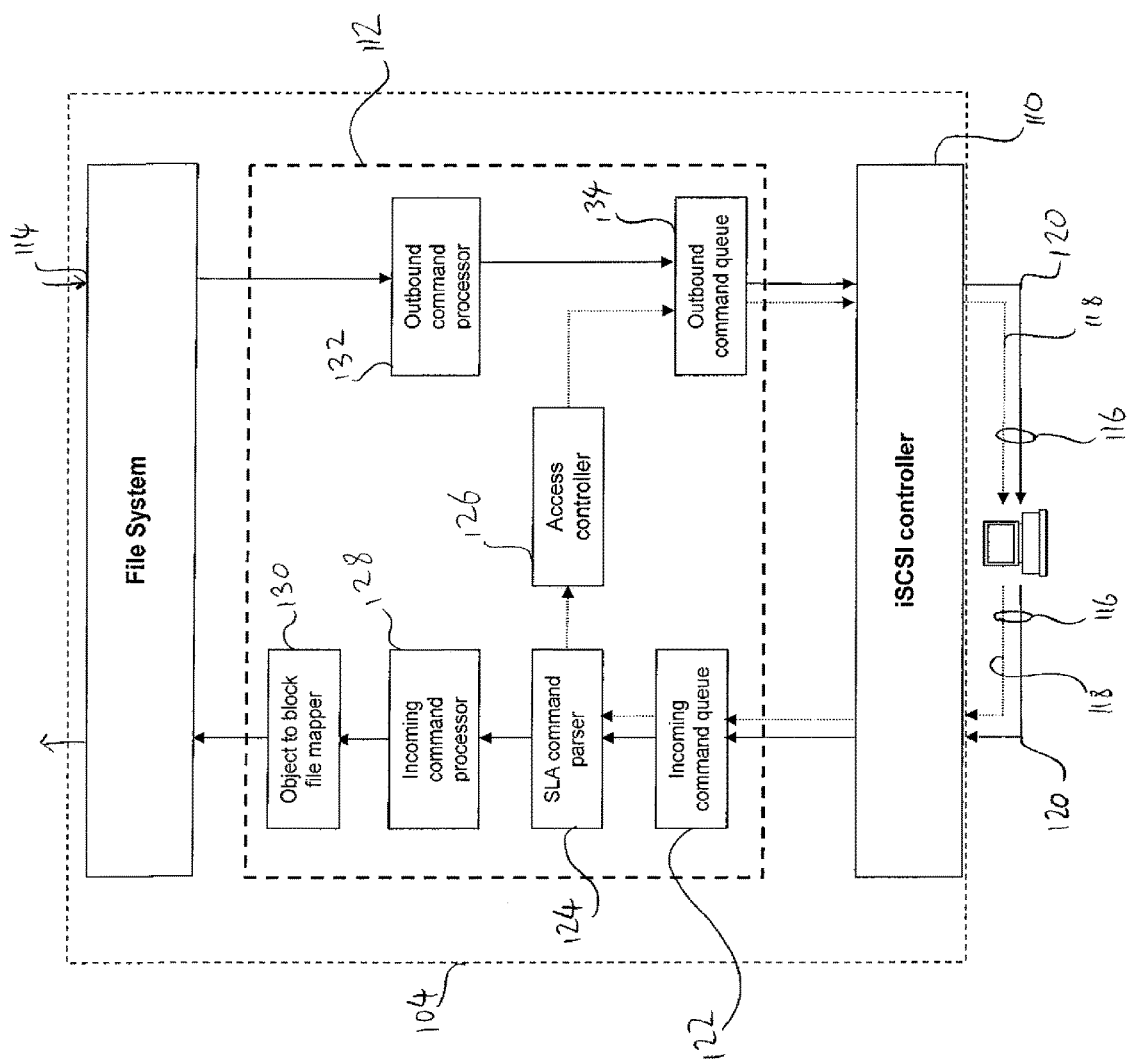
FIG. 4 is a schematic diagram showing the components of the OSD block of FIG. 3 in more detail.

FIG. 4 shows a detailed schematic view of the storage controller 104, with particular focus on the OSD block 112. In this example, the network storage commands 116 (in this example, using the iSCSI and OSD protocols) are used to transmit QoS parameters 118 in the form of an SLA, together with the usual network storage command data 120 in iSCSI/OSD format. This is achieved as described below.

As described above, metadata is associated with the data stored in the underlying storage system commands. The metadata generally refers to attributes of the relevant object and/or object data. However, in some cases, the metadata is user generated and can be set using specific commands of the protocol. Further, there are normally reserved and/or known bad identifiers in the command protocol. Therefore, there exists spare capacity within a storage command (such as an iSCSI/OSD command) in which additional data can be transmitted. Consequently, it is possible to use the available or non-reserved space in a storage command to transmit an SLA to request a quality of service-based access session, i.e. an access session requested on the basis of a required quality of service level for that access session or data transfer at that time.

In the case of the Object-based Storage Device (OSD) protocol, it is possible for the underlying OSD system to be programmed such that a particular object ID is never used in response to a write instruction. This means that a command targeted at the particular object ID can set attributes (metadata) to the underlying device, together with an instruction to "get" the set attributes. The SLA terminology can then be transferred within the attributes to be "set" to the underlying device, i.e. addressed using the particular specified, non-reserved object ID.

The components within the OSD block 112 are shown in FIG. 4. The OSD block 112 has an inbound command section which comprises an incoming command queue block 122, an SLA command parser 124, an access controller 126, an incoming command processor 128 and a file mapper 130.

The incoming command queue block 122 is configured to receive, from the iSCSI controller 110, the network storage command 116 which comprises storage commands 120 and SLA parameters 118. The incoming command queue block 122 is connected to the incoming command processor 128 via the SLA command parser 124 and is configured to pass commands 116 thereto from the queue.

The incoming command processor 128 is arranged to process the SCSI/OSD storage commands 120 in the network storage command 116 and, based upon these commands, to instruct the file mapper 130 to map the data read/write or data transformation requested by the commands from the object-based format to a block file format which can be interpreted by the file system 114. The file mapper 130 functions as an interface with the file system 114, providing mapped commands for further processing and access to the appropriate unit forming part of a data storage component 106 of the data storage resource 102.

The OSD block 112 further includes an outbound command section which comprises an outbound command processor 132 and an outbound command queue block 134. The outbound command processor 132 is operable to receive storage commands, and data from the file system 114 and to pass these commands and data to the outbound command queue block 134, which queues the commands for communication to the iSCSI controller 110.

The implementation of in-band SLA commands will now be described. The SLA command parser 124 is configured to look for commands in the incoming object stack addressed to the specified object ID associated with the SLA commands 118. Upon detection of the specified object ID, the SLA command parser 124 is configured to route these commands 118 to the access controller 126.

The access controller 126 is connected to both the incoming and outbound command sections. The access controller 126 is operable to examine the attributes of the object ID which were "set" to determine the SLA request, and is able to use this information to determine whether the SLA request should be allowed or denied. The determination may be based upon any suitable criteria or consideration; for example, storage capacity available.

The access controller 126 is configured to provide either an accept "yes" or reject "no" command to the outbound command queue block 134. The outbound command queue block 134 is configured to inject this data back into the metadata attribute pages addressed to a specified object ID as SLA data 118 in an outgoing network storage command 116, where it is included together with storage command data 120 addressed to other object IDs. The outbound command queue block 134 is configured to pass the network storage command 116 to the iSCSI controller 110 where it is transmitted to the client computer 14.

Figure 5:
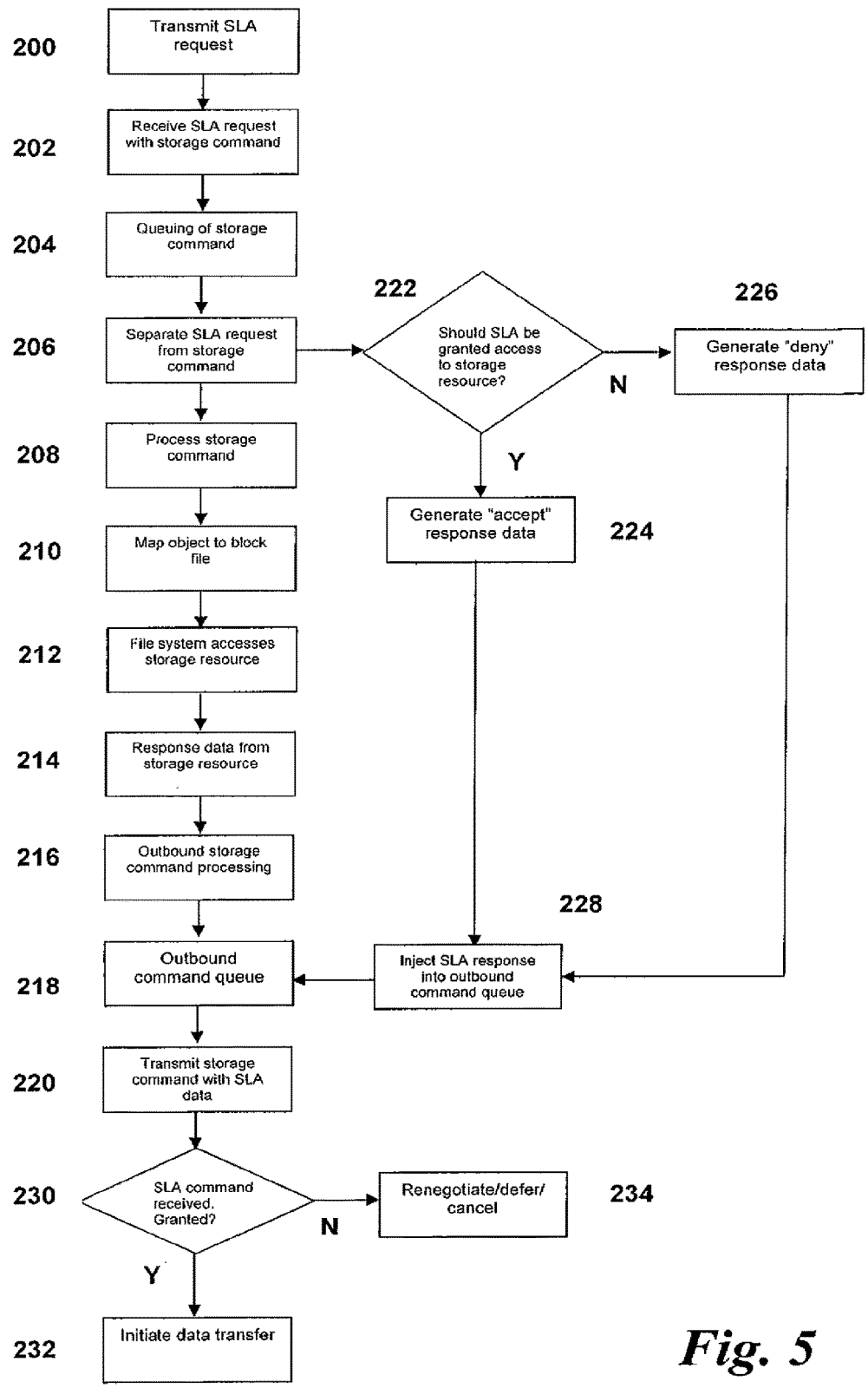
FIG. 5 is a flowchart illustrating the operation of the OSD block of FIG. 4.

The operation of the electronic data store 100 with particular reference to the operation of the OSD block 112 will now be described with reference to FIG. 5.

Step 200: Connection to Data Resource and Transmission of an SLA Request Within a Storage Command The process of obtaining access to the electronic data store 100 begins when a client computer initiator 14 connects to the electronic data store 100 through an interface such as a webpage or portal held on the storage controller 104. The client computer initiator 14 then sends an SLA request 118 to the storage controller 104.

The initiator itself may be a service component of a service orientated system operating on the client computer 14, it may be a controller for such a system or it may be a stand-alone configuration application running on the client computer initiator 14; for example, a communication utility which operates both an iSCSI software interface and an SLA configuration utility.

The SLA request 118, as described, is inserted into an iSCSI storage command 116, along with additional storage data 120 as required. Using the OSD protocol, metadata attributes available for proprietary use is used to carry data relating to the SLA request 118.

The SLA request 120 may include the following parameters: access bandwidth, maximum tolerable latency, predicted volume of data, future start time for an access sequence and duration of the SLA request. These values are encapsulated within metadata tags in the proprietary page.

Within the OSD protocol it is possible to concatenate set and get commands. Therefore, a single command can be constructed that attempts to set all the required attribute of the SLA into a single command targeting a particular object ID. A get attribute for a different tag, either on the same page or not, coming from the client computer initiator 14 will expect a response of the value of that attribute. Therefore, in the case of set/get attribute commands to the object ID, the value of this response can indicate to the client computer initiator 14 whether the SLA is accepted or rejected.

Step 202: Receipt of the Storage Command

The iSCSI controller 110 receives the storage command 116, including the SLA request 120, from the client computer initiator 14 via the TCP/IP protocol across a network such as a local area network (LAN) or the Internet using existing network infrastructure. The iSCSI controller 110 then passes the storage command 116 to the incoming command queue block 122 of the OSD block 112, and the method proceeds to step 204.

Step 204: Queuing of the Storage Command

The incoming storage command 116 is then queued by the incoming command queue block 122 and released as appropriate to the incoming command processor 128 via the SLA command parser 124.

Step 206: Separation of the SLA Request from the Storage Command

The SLA command parser 124 examines the storage command 116 for the specified object ID address containing the SLA request. If the SLA command parser 124 detects this object ID the SLA command parser 124 routes this object ID to the access controller 126 for processing at step 222. The remaining object IDs and metadata are routed to the incoming command processor 128 at step 208.

Step 208: Processing of the Storage Command

The incoming command processor 128 processes the iSCSI/OSD storage commands 120 in the network storage command 116, extracting metadata as appropriate. The incoming command processor 128 then provides commands to the file mapper 130 at step 210.

Step 210: Map Object to Block File

The file mapper 130 then proceeds to map the data read/write or data transformation specified by the incoming command processor 128 from the object-based format to a block file format which can be interpreted by the file system 114. The file mapper 130 interfaces with the file system 114 to provide mapped commands for further processing and access to the appropriate unit (for example, a data storage component) of the data storage resource 102. The method then proceeds to step 212.

Step 212: Access Storage Resource

The file system 114 provides a protocol and access structure to write data to/read data from the data storage resource. The method then proceeds to step 214.

Step 214: Response from Storage Resource

Data returning from the storage resource is processed by the file system 114 which in turn provides data to the outbound command processor 132 for processing at step 216.

Step 216: Outbound Command Processing

Data from the storage resource 102 and file system 114 is placed in the correct format for transmission as data and related metadata 120 in a storage command 116 by the outbound command processor 132. The method then proceeds to step 218.

Step 218: Outbound Command Queue

Commands are held in an outbound command queue by the outbound command queue block 134. Whilst in the queue, SLA data 118 is injected as appropriate into the commands 116 at step 228 which is described below.

The outbound command queue block 134 then passes the network storage command 116 to the iSCSI controller 110 where it is transmitted to the client computer 14 in step 220.

Step 220: Transmit Storage Command with SLA Data

The iSCSI interface 110 then transmits the storage command 116, together with any SLA data 118, to the client computer initiator 14. The method then proceeds to step 230.

Step 222: Determine Whether SLA Should be Granted

The access controller 126 examines the attributes of the object ID which were "set" to determine the SLA request, and is able to use this information to determine whether the SLA request should be allowed or denied. The determination may be based upon any suitable criteria or consideration; for example, storage capacity available or whether the QoS parameters defined in the SLA can be met by the storage resource 102.

The access controller 126 is configured to provide either an accept "yes" (in which case the method proceeds to step 224) or reject "no" command (in which case the method proceeds to step 226).

Step 224: Generate "Accept" Response Data

If, at step 222, the access controller 126 determines that the SLA request should be granted, then the access controller 126 returns that value of the "get" attribute in the metadata page corresponding to the object ID assigned to communicate SLA commands. The method then proceeds to step 228.

Step 226: Generate "Reject" Response Data

If, at step 222, the access controller 126 determines that the SLA request should be denied or deferred, then the access controller 126 returns that value of the "get" attribute in the metadata page corresponding to the object ID assigned to communicate SLA commands.

It is also possible for a more detailed group of attribute "get" instructions to return to the client computer initiator 14 a more complete set of data e.g. in addition to the main SLA response, an alternative SLA having QoS parameters that could be met if the original request cannot be met. This will set up a chain of SLA negotiations between the client computer initiator 14 and the storage controller 104 target using storage commands 116.

The method then proceeds to step 228.

Step 228: Inject SLA Response into Outbound Command Queue

The outbound command queue block 134 injects data generated by the access controller 106 from either step 224 or step 226 back into the appropriate object ID address as. SLA data 118. This data is injected into an outgoing network storage command 116 where it is included together with storage command data 120. In this way, the normal storage protocol can be used to transfer the SLA response to the client computer initiator 14.

The method then proceeds to step 220.

Step 230: SLA Command Received. Grant or Deny?

The network storage command 116 is received by the client computer initiator 14. As described with reference to step 200, the initiator itself may, for example, comprise a software-based communication utility which operates both as an iSCSI software interface and an SLA configuration utility.

The SLA request 118 is extracted from the "get" attributes of the iSCSI storage command 116 which contains the data relating to whether the SLA request has been granted or denied. If the request has been granted, the method proceeds to step 232. Otherwise, the method proceeds to step 234.

Step 232: SLA Command Granted and Data Transfer Initiated

If the SLA request is granted, then (for example) the data storage resource 102 can meet the QoS requirements of the SLA and data transfer between the client computer initiator 14 and the target data storage resource 102 can commence. In some cases there may be a credential control or access control step from the point of view of security. However, this is an optional step which may be required by the service provider.

Figure 6:
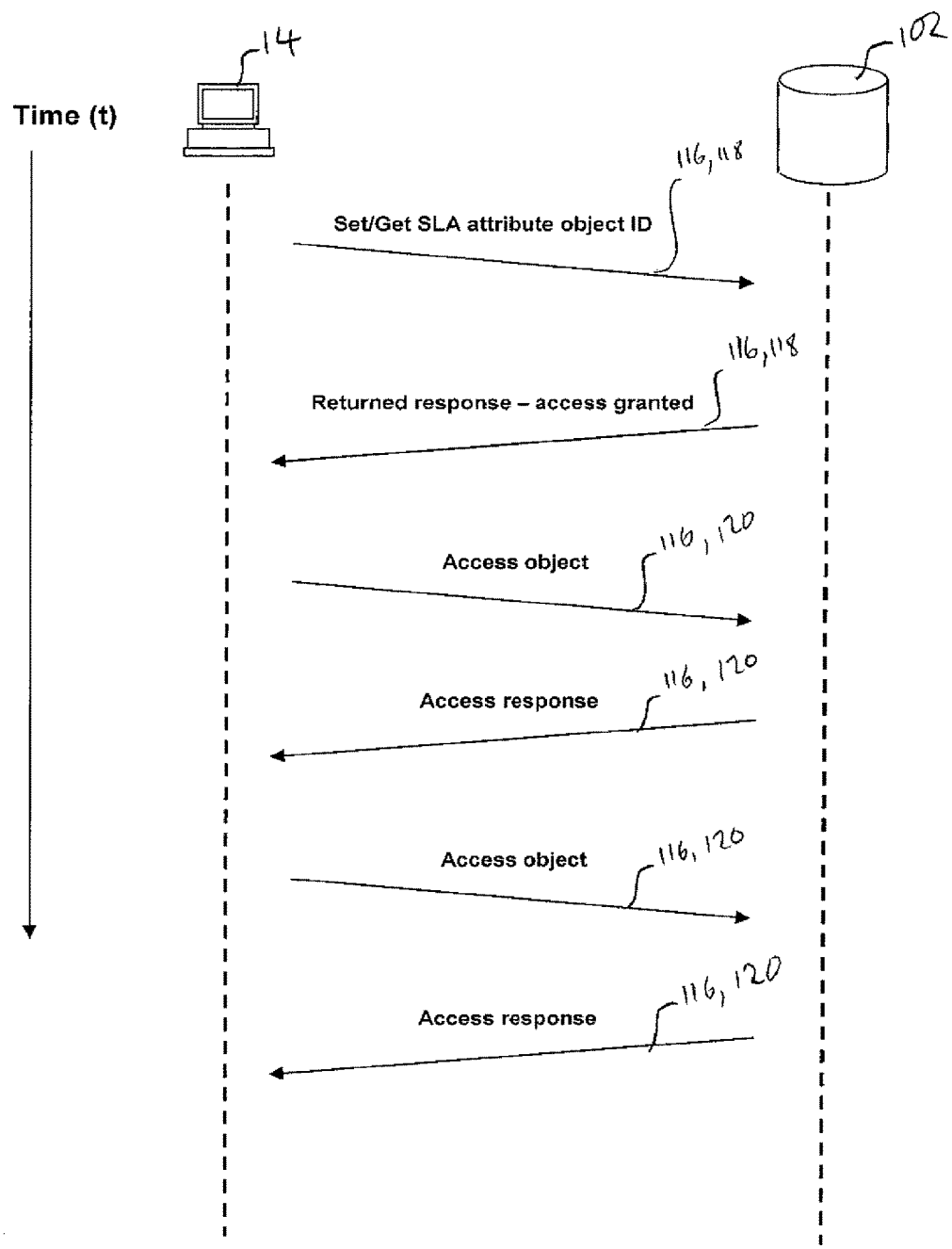
FIG. 6 is a schematic diagram showing the exchange of storage commands between a client computer and the electronic data store.

The client computer initiator 14 then starts a sequence of accesses to the data storage resource. This is shown schematically in FIG. 6. For each access object command 116, an access response command 116 is passed back to the client computer initiator 14 from the target data storage resource 102. Each access object command 116 and access response command 116 may comprise both storage data 120 and SLA data 118.

SLA command data is not necessarily required once access to the data storage resource 102 has been granted. However, a service provider may wish to continue to send/receive SLA data 118 with each command 116, with a set number of commands 116, or periodically with a command 116 to account for changes in storage resource utilisation. For each additional command 116 containing SLA data 118, the method would progress back to step 200.

Step 234: SLA Command Denied

If the SLA request is denied, then (for example) the data storage resource 102 cannot meet the QoS requirements of the SLA and data transfer between the client computer initiator 14 and the target data storage resource 102 cannot commence at this stage.

In some cases, the client computer initiator 14 will simply be refused access to the data storage resource. Alternatively, the connection may be deferred until a later time when the storage resource 102 has greater capacity or bandwidth available.

In a further alternative, the SLA attribute "get" instructions may contain a more complex set of data e.g. an alternative SLA that could be met in the event that the original request cannot be met. If this is the case, then the method will revert back to step 200 and the client computer initiator 14 will initiate a new SLA request (potentially with less demanding QoS requirements which the data storage resource 102 may be able to meet) as part of a negotiation procedure. This may potentially set up a chain of SLA negotiations between the client computer initiator 14 and the storage controller 104 target using storage commands 116. The negotiations will continue until the client computer initiator 14 and the target data storage resource 102 are agreed on a common QoS to be provided by the data transfer access session, and data transfer can then be agreed.

The above described apparatus and method provides the advantage that a QoS-based data access session can be agreed with reduced hardware, software and bandwidth requirements when compared to known arrangements. The advantages of per session QoS negotiations and agreements are that the current behaviour of the data storage resource 102 (for example, current data accesses on the resource) can be taken into account when granting SLAs or determining whether QoS parameters can be met at the time the transfer is required. In contrast to known arrangements whereby data is merely given a priority level of storage location on the storage resource, by conducting QoS negotiation at the time the particular transfer period or session is required, the need for over-provisioning of the storage resource is reduced or even eliminated.

Figure 7:
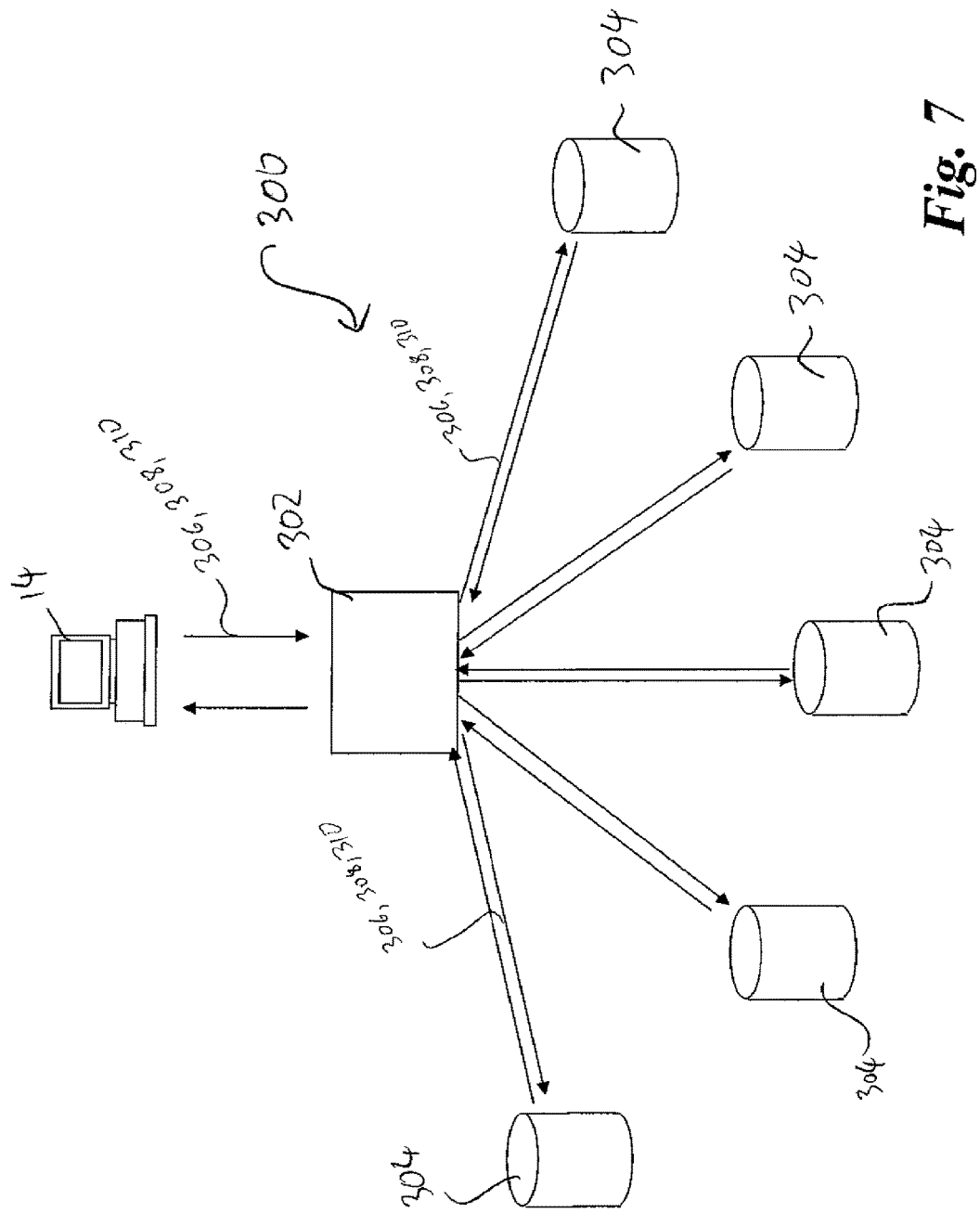
FIG. 7 is a schematic diagram showing an alternative' embodiment of an electronic data store using a metadata server.

FIG. 7 shows a second embodiment of a data store 300. The second embodiment of the data store 300 comprises a metadata server 302 and a plurality of peer data storage resources 304.

The metadata server 302 controls the flow of data into and out of the storage resources 304, and controls access to the storage resources 304 from the client computer initiator 14.

The metadata server 302 is configured to function as a portal for a client computer 14 and presents an interface for communication between a client computer 14 and one or more data storage resources 304. This may take the form of, for example, a webpage or a portal whereby a user can request access to a data storage resource 304.

The metadata server 302 is operable to receive SLA requests (and their respective QoS requirements) from the client computer 14. The metadata server 302 is further operable to process SLAs requests and to determine whether the SLA request should be accepted or denied. This may be based on a number of factors or considerations; for example, the current usage of a particular data storage resource 304. The metadata server 302 is also arranged to respond to the client computer 14 either granting or denying the client computer 14 access to a data storage resource 304 in the manner of the storage controller 104 of the previous embodiment. Indeed, the general operation of the metadata server 302 in the manner described with respect to the storage controller 104 above.

The operational features of the metadata server 302 may be implemented in either a hardware or software layer. The skilled person will be readily aware that the above features of the present embodiment could be implemented in a variety of suitable configurations and arrangements within the context of the present invention.

Each data storage resource 304 may be a "storage box" comprising one or more storage drives and a storage controller as described with reference to the previous embodiment. Alternatively, each data storage resource 304 may simply be an object-based storage device with minimal control aspects.

The data storage resources 304 communicate with the metadata server 302 using the iSCSI protocol over a network such as a local area network (LAN) or the Internet using existing network infrastructure, depending upon the relative location of the data storage resources 304 and the metadata server 302. Clearly, the metadata server 302 may be remote from the data storage resources 304 provided the plurality of devices is connected through an appropriate network. Further, the data storage resource 304 may be located remote from one another.

The client computer initiator 14 interacts with the metadata server 302 which acts as an intermediary target for iSCSI network storage commands 306 between the client computer 14 and a target data storage resource 304. The network storage commands 306 comprise storage data 308 and SLA data 310 in a manner similar to the network storage commands 116 of the previous embodiment.

Figure 8:
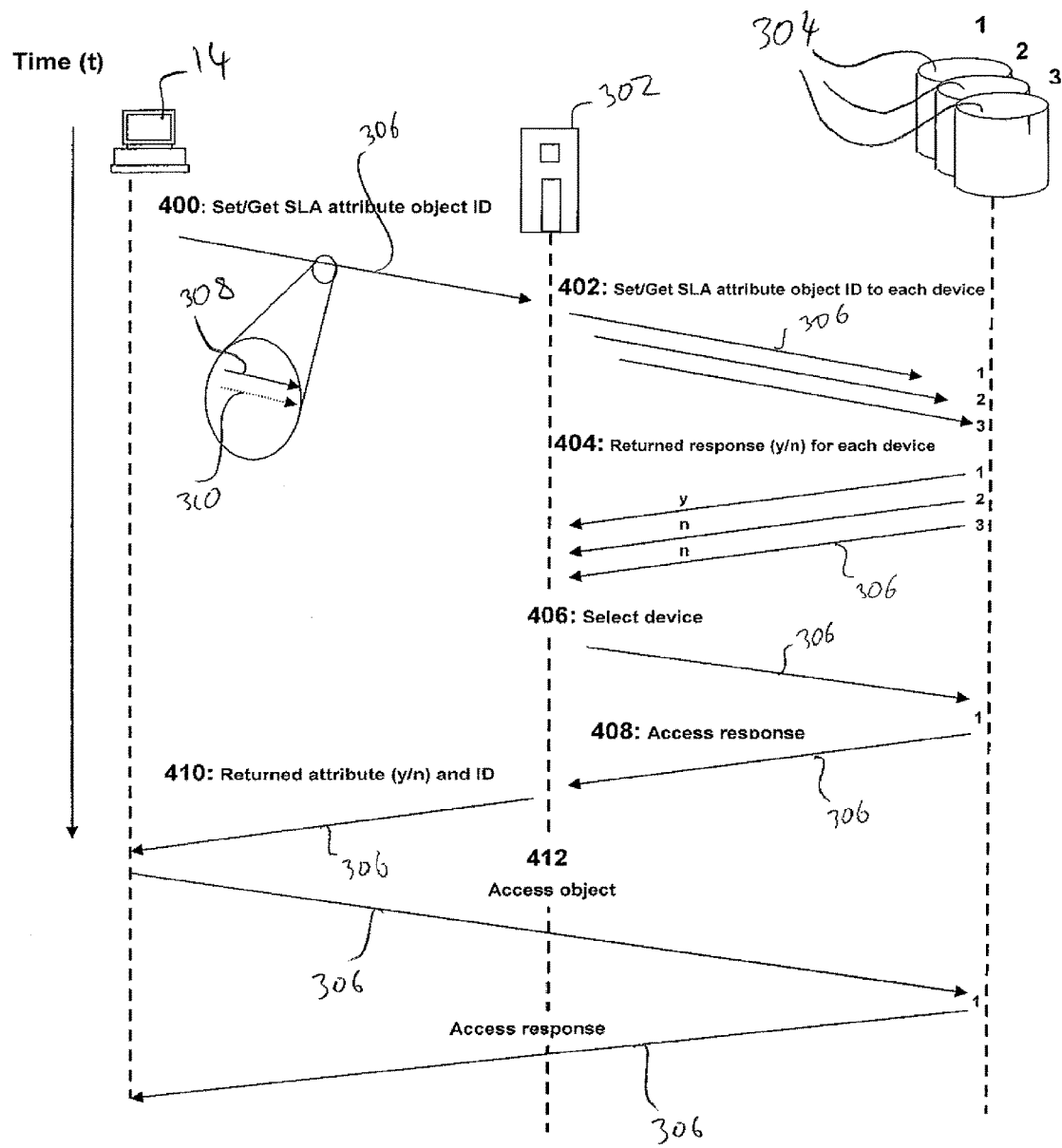
FIG. 8 is a schematic diagram showing the exchange of storage commands between a client computer, metadata server and data storage resources of FIG. 7.

The method of operation of the second embodiment will now be described with reference to FIG. 8. FIG. 8 shows a schematic diagram of command exchanges between a client computer initiator 14, the metadata server 302 and a number of data storage resources 304 under the command of the metadata server 302. Three data storage resources 304 are shown in FIG. 8. However, it will be appreciated that any suitable number of data storage resources 304 could be used.

Step 400: Transmission and Receipt of SLA Request Within Storage Command

In the case of a new SLA request for new data to be placed on a storage resource 304, the client computer initiator 14 transmits a network storage command 306 including SLA data 310 to the metadata server 302. The storage command 306 is in the form of an iSCSI command as described with reference to the previous embodiment.

The storage command 306 is then received by an iSCSI interface of the metadata server 302. The method then proceeds to step 402.

Step 402: Transmission of SLA Request Within Storage Command to Object-based Storage Devices The metadata server 302 then sends the SLA request 310 out to each of the underlying storage resources 304 under the command of the metadata server 302. This involves the metadata server 302 transmitting multiple network storage commands 306 comprising storage data 308 and SLA data 310, one to each data storage resource 304. The respective storage commands 306 are received by iSCSI controllers (not shown) of each of the data storage resources 304 and processed thereby. The method then proceeds to step 404.

Step 404: Response to SLA Request Within Storage Command to Object-based Storage Devices These storage resources 304 then each respond regarding whether they are able to meet the requirements of the SLA request. This is done by injecting either an accept (yes) or reject (no) SLA command data 310 into the appropriate get object ID address as SLA data 310 in the network storage command 306. In this way, the normal storage protocol can be used to transfer the SLA response to the metadata server 302. The method then proceeds to step 406.

Step 406: Select Device

The metadata server 302 then selects a storage resource 304 which meets the requirements of the SLA request and identifies this storage resource 304 to the client computer initiator 14. This storage resource 304 is then identified as the target device for the client computer initiator 14. In the example shown in FIG. 8, data storage resource 1 can meet the QoS requirements of the SLA request; whereas data storage resources 2 and 3 cannot. Therefore, the metadata server 302 selects data storage resource 1 as the target device for the client computer initiator 14.

Step 408: Access Response

The data storage resource 1 selected as the target device then returns object IDs and access response to the metadata server 302 prior to initiation of a data transfer.

In one example, a collection object can be created at this time on the selected underlying storage device 304 and the ID for this collection is returned to the client computer initiator 14 when the attributes are returned (step 410). All data stored by the client computer initiator 14 is then contained in objects that are part of the specified collection. This is analogous to the creation of user home file-space in a shared disk environment. The collection standard is defined in the OSD standards. However, the skilled person will appreciate that the collection concept is also applicable to other object based standards/protocols.

Step 410: Return Attribute to Initiator

Now that the data storage resource 1 has been identified as the target, the SLA get attributes specifying either the collection ID or object ID are returned as SLA data 310 to the client computer initiator 14 as part of a network storage command 306. The method now proceeds to step 412.

Step 412: Data Transfer

Data transfer can now take place using Access objects and Access responses as set out in the first embodiment, with the metadata server 302 acting as an intermediary in the data transfer.

Variations on the above method are possible. For example, in a case where the initiator 14 wishes to access data already stored on one of the storage devices 302, the SLA request 310 could include the object identifier (or file name for the data) that the initiator 14 wishes to access (e.g. the collection ID as described above). The metadata server 302 then communicates this request to the particular data storage resource 304 upon which this data exists, without the need to determine which of the data storage resources 304 is able to meet the SLA request (steps 402 and 404).

Alternatively, if replicas of the data exist on one or more storage resources 304, the metadata server 302 farms out the request to storage resources 304 which the metadata server 302 knows a replica of the required data can be found. In this case, the SLA request need not contain a specific object identifier. The underlying devices then respond to the metadata server and the metadata server, in turn, responds to the initiator with an accept/deny response and the method proceeds as described above.

The second embodiment illustrates that the principle of moving the SLA terms (all terms, the explicit SLA terms and any object ID that needs to be transferred) using the attribute pages of a non-reserved object ID is as valid for the communication of an SLA request between a client computer initiator 14 and the metadata server 302 as it is between the metadata server 302 and the storage resources 304 controlled by the metadata server 302.

Variations of the above embodiments will be apparent to the skilled person. The precise configuration of hardware and software components may differ and still fall within the scope of the present invention. For example, the embodiments described provide a method and apparatus whereby QoS parameters (in the form of SLAs) can be agreed with a service provider on a per session basis. Other arrangements for negotiation of per session QoS parameters may be used which do not involve in-band communications; for example using additional communication channels or through a separate interface.

Further, the data store 100 may not use SLAs and instead may communicate quality of service parameters using different protocols.

SCSI protocols and OSD objects are one possibility for storage resource management. Other suitable protocols may be used, in particular storage protocols such as, for example, OSD2, OSD3, SCSI or any other suitable protocol which is capable of communicating storage commands. Whilst iSCSI is mentioned here, other SCSI type formats or similar storage protocols may be used which transmit command data in-band and which, preferably, have capacity to incorporate QoS parameters therein. Any protocol which allows the provision of arbitrary meta-data to be sent along with the storage commands may be used, for example, protocols which allow meta-data in each command to be "overloaded" and used'to communicate extra messages in-band with the storage command stream.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. An apparatus comprising:
a controller, implemented on a computing device, for an initiator, the controller coupled to memory and programmed to effect network communication with a target data store utilizing a storage protocol, the controller programmed to:
initiate a request for a data transfer session between the initiator and the target data store over a network, the request comprising at least one command of the storage protocol from the initiator to the target data store, the command specifying quality of service parameters specific to the data transfer session;
receive, from the target data store, a response accepting or denying the data transfer session based on whether the quality of service parameters can be met by the target data store; and
if the request is accepted, establish the data transfer session between the initiator and the target data store and commence the data transfer session; and
the storage protocol is an object-based storage device (OSD) protocol, and at least one network storage command is addressed to a non-reserved object identification (ID) address.

2. The apparatus of claim 1, wherein the controller is programmed to receive a response from the target data store deferring the data transfer session by a time delay or a negotiation process.

3. The apparatus of claim 1, wherein the controller is programmed to initiate a plurality of requests for data transfer sessions associated with a plurality of quality of service parameters, and
the at least one network storage command of a particular request specifies quality of service parameters specific to the data transfer session associated with the particular request.

4. The apparatus of claim 1, wherein the at least one network storage command is addressed to a specified object identification (ID) address, and the quality of service parameters for the data transfer session are specified in metadata attributes of the network storage command associated with the specified object ID address.

5. The apparatus of claim 1, wherein:
the quality of service parameters are associated with a specified object identification (ID) address; and
the at least one network storage command to the specified object ID address allows the initiator or the target data store to obtain the quality of service parameters stored thereat.

6. The apparatus of claim 1, wherein the quality of service parameters form part of a service level agreement (SLA) specifying the requirements of a desired connection.

7. The apparatus of claim 1, wherein the storage protocol is a Small Computer System Interface (SCSI) protocol.

8. An apparatus comprising:
a controller, implemented on a computing device, for a client computer initiator, the controller coupled to memory and programmed to effect network communication with a target data store utilizing an object-based storage device (OSD) storage protocol, the controller programmed to:
initiate a request for a data transfer session between the client computer initiator and the target data store over a network, the request comprising at least one network storage command of the storage protocol from the client computer initiator to the target data store, the command specifying quality of service parameters specific to the data transfer session, wherein the quality of service parameters are associated with a specified object identification (ID) address, and the at least one network storage command to the specified object ID address allows the client computer initiator or the target data store to obtain the quality of service parameters stored thereat; and receive, from the target data store, a response accepting or denying the data transfer session based on whether the quality of service parameters specific to the data transfer session can be met by the target data store; and if the request is accepted, establish the data transfer session between the client computer initiator and the target data store and commence the data transfer session; and the specified object ID address is a non-reserved object ID address.

9. The apparatus of claim 8, wherein the controller is programmed to receive a response from the target data store deferring the data transfer session by a time delay or a negotiation process.

10. The apparatus of claim 8, wherein:
the controller is programmed to initiate a plurality of requests for data transfer sessions associated with a plurality of quality of service parameters; and
the at least one network storage command of a particular request specifies quality of service parameters specific to the data transfer session associated with the particular request.

11. The apparatus of claim 8, wherein:
the at least one network storage command is addressed to at least one object identification (ID) address; and
the quality of service parameters for the data transfer session are specified in metadata attributes of the network storage command associated with the at least one object ID address.

12. The apparatus of claim 8, wherein the quality of service parameters form part of a service level agreement (SLA) specifying the requirements of a desired connection.

13. The apparatus of claim 8, wherein the storage protocol is a Small Computer System Interface (SCSI) protocol.

14. A method comprising:
requesting a data transfer session between an initiator and a target data store over a network, the request specifying parameters specific for the data transfer session;
receiving a response accepting or denying the data transfer session based on whether the parameters can be met by the target data store; and
if the request is accepted, carrying out the steps of:
establishing the data transfer session between the initiator and the target data store; and
commencing the data transfer session;
at least the requesting step utilizes an object-based storage device (OSD) storage protocol;
the parameters are associated with a specified object identification (ID) address;
the request comprises at least one network storage command to the specified object ID address that allows the initiator or the target data store to obtain the parameters stored thereat; and
the specified object ID address is a non-reserved object ID address.

15. The method of claim 14, wherein, if the request is not accepted, deferring the data transfer session by a time delay or a negotiation process.

16. The method of claim 15, wherein:
the parameters for the data transfer session are specified in metadata attributes of the network storage command associated with a specified object identification (ID) address.

* * * * *